(12) United States Patent
Stevenson

(10) Patent No.: US 6,595,891 B1
(45) Date of Patent: Jul. 22, 2003

(54) ALL-WHEEL DRIVE AUTOMATIC TRANSMISSION

(75) Inventor: Paul Dwight Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/078,209

(22) Filed: Feb. 19, 2002

(51) Int. Cl.$^7$ ............................................. F16H 37/08
(52) U.S. Cl. ........................ 475/205; 475/206; 180/248
(58) Field of Search ................................ 475/198, 205, 475/206; 180/248

(56) References Cited

U.S. PATENT DOCUMENTS

| | | | | |
|---|---|---|---|---|
| 3,354,747 A | * | 11/1967 | Hobbs | 475/205 |
| 3,802,294 A | * | 4/1974 | Smirl | 475/205 |
| 4,457,394 A | * | 7/1984 | Suzuki | 475/205 |
| 5,106,352 A | * | 4/1992 | Lepelletier | 475/280 |
| 5,162,025 A | * | 11/1992 | Carriere | 475/198 |
| 5,904,632 A | * | 5/1999 | Brown et al. | 475/206 |
| 6,045,476 A | * | 4/2000 | Haka | 475/205 |
| 6,142,905 A | * | 11/2000 | Brown et al. | 475/198 |

* cited by examiner

*Primary Examiner*—Sherry Estremsky
(74) *Attorney, Agent, or Firm*—Leslie C. Hodges

(57) ABSTRACT

A powertrain incorporating an engine, a planetary gear assembly and front and rear final drive assemblies has a plurality of planetary gear sets and torque transmitting mechanisms enclosed within a rotatable housing which transfers power from an output differential mechanism in the planetary gear assembly to a transfer drive mechanism disposed between the transmission input and the transmission gearing. The rotatable housing surrounds a plurality of torque transmitting mechanisms including at least two stationary torque transmitting mechanisms which are secured partially or operatively with a grounding member extending longitudinally within said transmission and being connected with a stationary housing disposed in said transmission housing intermediate said torque transmitting mechanisms and said torque converter.

4 Claims, 2 Drawing Sheets

ALL-WHEEL DRIVE AUTOMATIC TRANSMISSION

TECHNICAL FIELD

This invention relates to automatic transmissions for vehicles and, more particularly, to transmissions providing drive to both the front and rear wheels of the vehicle.

BACKGROUND OF THE INVENTION

All-wheel drives and four-wheel drives are commonly used in many passenger vehicles today. These vehicles generally include sport utility vehicles; however, some passenger type vehicles are also equipped with all-wheel drive powertrains. In the all-wheel drive powertrain, the engine and transmission are generally forward on a vehicle, and a transfer case or drop box is attached to the rear of the transmission and receives input drive from the conventional output shaft of the transmission. The transfer case generally includes a chain or gear drive from one axis to another axis to permit the front-wheel drive or a gear arrangement between the transmission output shaft which is the input to the transfer case and the second axis which contains the front-wheel drive power shaft.

The transfer case, as previously mentioned, is secured to the rear of the transmission and therefore extends the longitudinal length of the powertrain, such that additional space under the vehicle is required to accommodate the engine, transmission, and transfer case. This generally means the tunnel hump is extended rearwardly in the vehicle between the driver and passenger seats. The powertrain may also require additional space to accommodate the positioning of the power shaft driving the front wheels. This space may also intrude into the passenger compartment, thereby reducing the amount of room or the volume within the passenger compartment.

SUMMARY OF THE INVENTION

It is an object of this invention to provide an improved powertrain for an all-wheel drive vehicle.

In one aspect of the present invention, the transmission includes an input shaft extending longitudinally of the transmission housing and a grounding shaft circumjacent the input shaft also extending longitudinally within the transmission case.

In another aspect of the present invention, a plurality of torque transmitting mechanisms, both rotary and stationary, are disposed rearwardly of the torque converter and forwardly of the output shaft.

In yet another aspect of the present invention, the stationary torque transmitting mechanisms are selectively connectable with the grounding shaft of the transmission.

In still another aspect of the present invention, the transmission includes a ratio gear set disposed rearwardly of the torque transmitting mechanisms and incorporating a differential gear set at the output end of the transmission.

In a further aspect of the present invention, the differential gear set incorporates both an output drive to the rear wheels and an output drive to the front wheels.

In a yet further aspect of the present invention, the output drive to the front wheels is comprised of a rotatable housing, which extends forwardly outboard of and surrounding the planetary gear set and the torque transmitting mechanism.

In a still further aspect of the present invention, the rotatable housing is drivingly connected with a transfer mechanism, which is disposed between the torque converter and the torque transmitting mechanisms of the transmission.

A powertrain, incorporating the present invention, includes an engine, a torque converter drivingly connected with the engine, a planetary gear arrangement including a plurality of planetary gear sets and torque transmitting mechanisms, an output differential mechanism drivingly connected with the planetary gear sets, and providing both front and rear wheel output drive mechanisms.

The output drive mechanism of the differential gear set, which is directed to the front wheels, includes a rotatable housing, which encloses or is disposed circumferentially of the torque transmitting mechanisms in the planetary gear set. This front wheel drive structure includes a transfer mechanism which transfers the drive from the axis of the transmission to an axis for the front-wheel drive power shaft.

The torque transmitting mechanisms, which are disposed interiorly of the rotatable housing, include a plurality of rotating torque transmitting mechanisms or clutches, and a plurality of stationary torque transmitting mechanisms or brakes. The brake mechanisms are disposed forwardly with relation to the powertrain of the rotary torque transmitting mechanisms.

A grounding shaft to which the brakes are operatively connectable is disposed circumjacent and coaxial with an input shaft. The input shaft transfers power from the torque converter to the rotating torque transmitting mechanisms and one member of the planetary gear set. The grounding shaft is connectable between the brakes and housings which are surrounding the torque transmitting mechanisms and connectable with various members of the planetary gear set. A portion or some of the rotary torque transmitting mechanisms are connectable with at least one of these housings.

The transfer mechanism is comprised of a pair of sprockets, one of which is rotatably mounted on the grounding shaft and the other is rotatably mounted in a housing outboard of the transmission. A chain drive is connected between the sprockets. The outboard sprocket member is drivingly connected with a shaft which transfers power forwardly to the front wheels of the vehicle. Alternatively, a gear drive mechanism may be utilized in place of the chain and sprocket mechanism.

DESCRIPTION OF THE PREFERRED EMBODIMENT

Figure 1A:
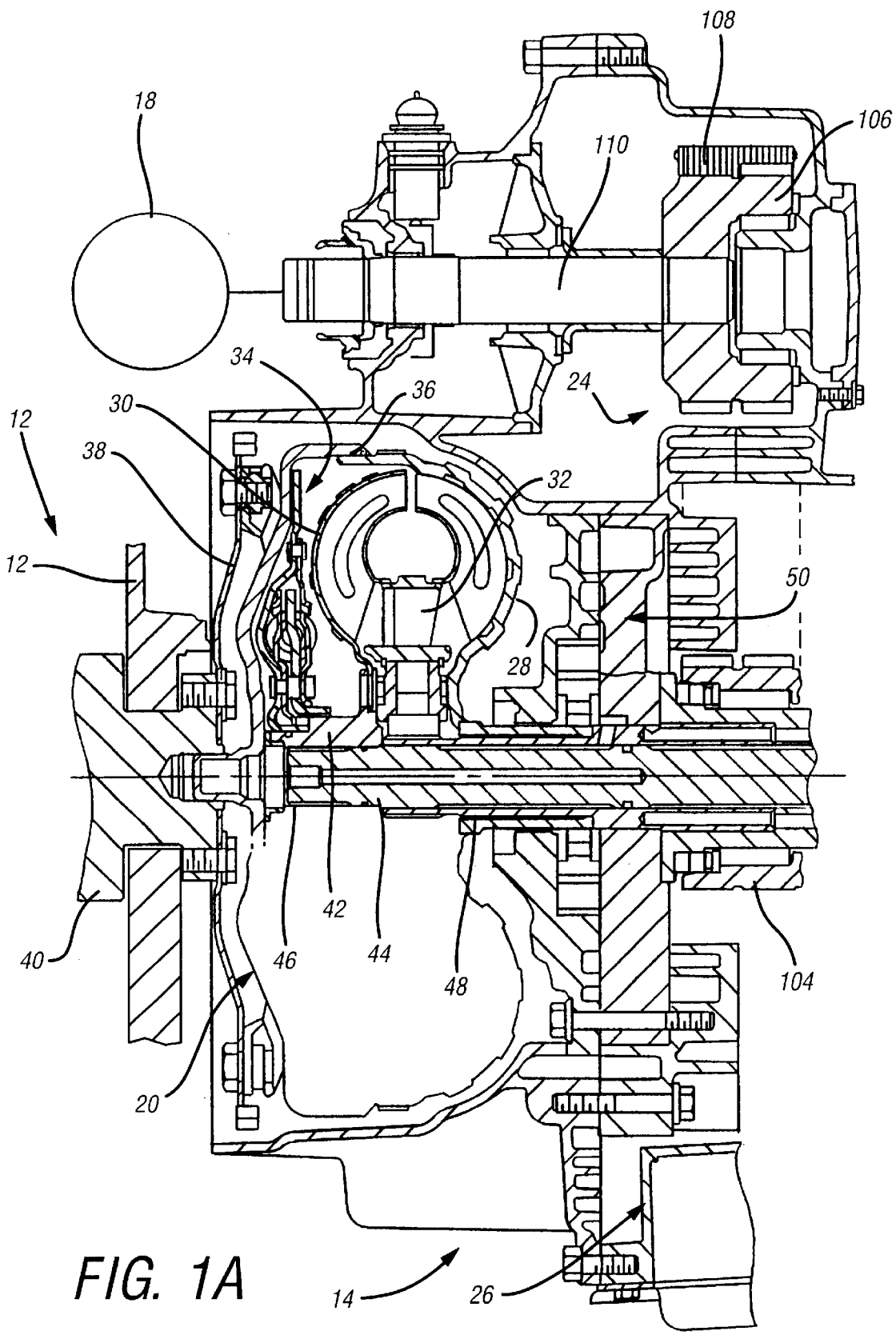
FIGS. 1A and 1B are cross-sectional elevational views of a portion of a powertrain incorporating the present invention.
Figure 1B:
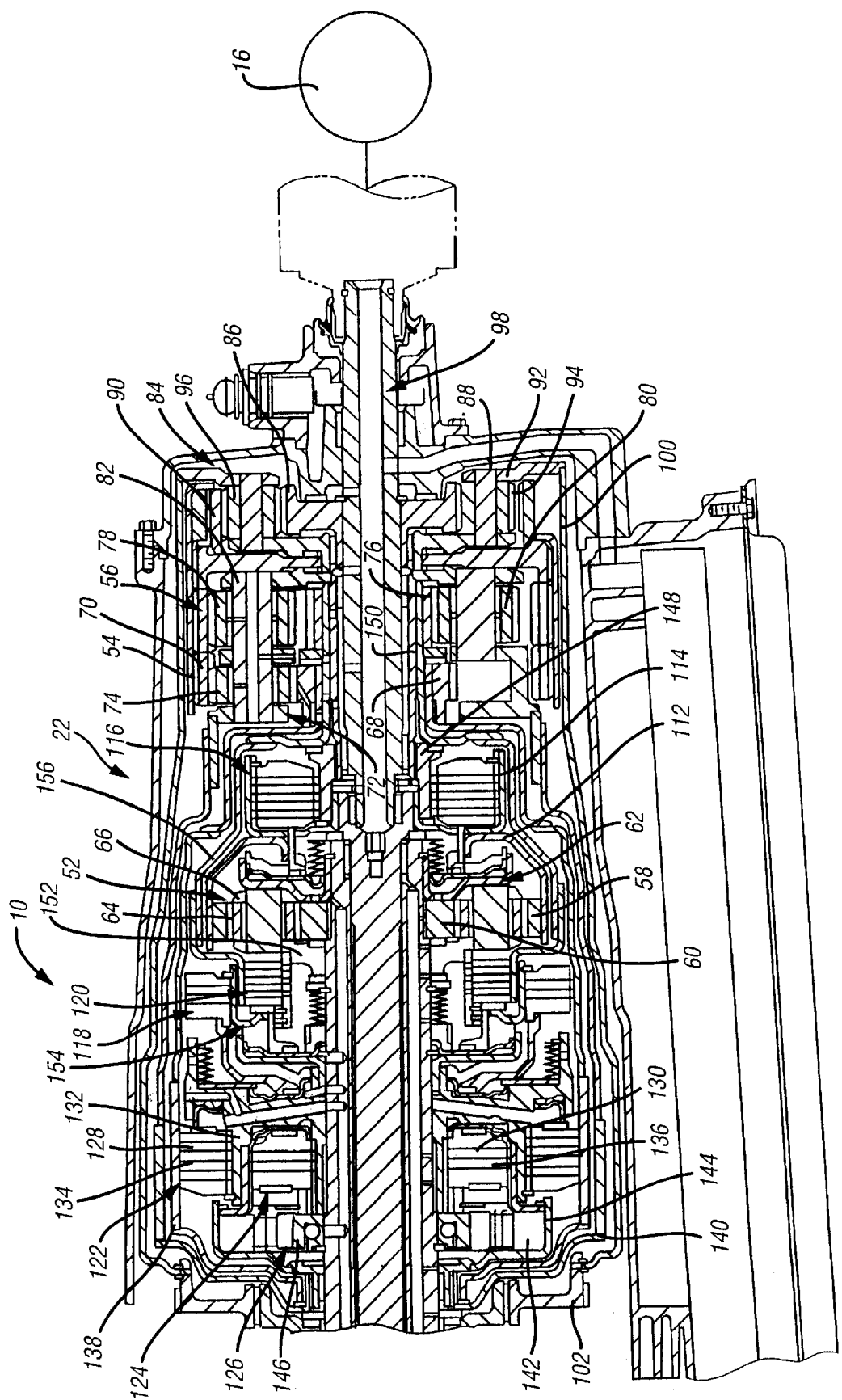

A powertrain 10 includes an engine 12, a transmission 14, a rear-wheel final drive 16 and a front-wheel final drive 18. The engine is a conventional internal combustion engine and the final drives 16 and 18 are conventional double-gear type final drive arrangements.

The transmission 14 includes a torque converter assembly 20, a planetary gear arrangement 22, and a drive transfer mechanism 24. The transmission 14 also includes a housing or case 26 which encloses the torque converter 20, the planetary gear arrangement 22 and the transfer mechanism 24. The torque converter 20 includes an impeller 28, a turbine 30, a stator 32 and a torque converter clutch 34.

The impeller 28 has incorporated therewith an input shell 36 which is secured with a flex plate 38 that in turn is secured with a crankshaft 40 of the engine 12. The turbine 30 has an inner hub 42 which is drivingly connected with a transmission input shaft 44 through a spline connection 46. The torque converter clutch 34 is disposed between the turbine 30 and the input shell 36 and is adapted to provide a mechanical drive connection between the input shell 36 and the transmission input shaft 44 in a well-known manner. The stator 32 is connected with a grounding shaft 48 that is secured to a pump housing 50 and grounded to the transmission case 26 through said pump housing 50. The input shaft 44 extends longitudinally from the torque converter 20 into the planetary gear arrangement 22.

The planetary gear arrangement 22 includes three planetary gear sets 52, 54 and 56. The planetary gear set 52 includes a ring gear 58, a sun gear 60, and a planet carrier assembly 62. The planet carrier assembly 62 includes a plurality of pinion gears 64 rotatably mounted on a carrier 66 and disposed in meshing relation with both the sun gear 60 and the ring gear 58.

The planetary gear set 54 includes a sun gear 68, a ring gear 70 and a planet carrier assembly 72. The planet carrier assembly 72 is also a portion of the planetary gear set 56, as is the ring gear 70. The planet carrier assembly 72 includes a plurality of pinion gears 74 that are rotatably mounted on the carrier 72 and disposed in meshing relation with the sun gear 68 and the ring gear 70.

The planetary gear set 56 also includes a sun gear 76. The planet carrier assembly 72 also includes a plurality of intermeshing pinion gears 78 and 80 that are rotatably mounted on a carrier portion 82 of the planet carrier assembly 72. The pinion gear 78 meshes with the ring gear 70 and the pinion gear 80 meshes with the sun gear 76.

The planetary gear arrangement 22 also includes a differential gear set 84 that includes a sun gear 86, a planet carrier assembly 88, and a ring gear 90. The planet carrier assembly 88 includes a carrier member 92 that rotatably supports a plurality of intermeshing pinions 94 and 96 that are disposed in mesh with the sun gear 86 and ring gear 90, respectively. The ring gear 90 is continuously connected with the ring gear 70 and the sun gear 86 is continuously connected with a rear drive transmission output shaft 98.

The carrier assembly 88 is continuously connected with a rotatable multi-piece housing 100 that extends forwardly in the transmission surrounding the planetary gear arrangement 22 and having a hub 102 that is drivingly connected with a sprocket 104 that is rotatably mounted on the grounding shaft 48. The sprocket 104 is drivingly connected with a sprocket 106 through a chain drive 108. The sprocket 106 is drivingly connected with a shaft 110 that is connected to the front-wheel final drive 18.

The transmission input shaft 44 is drivingly connected with the ring gear 58 through a hub 112. The hub 112 also has formed thereon a clutch housing 114 in which a rotating torque transmitting mechanism or clutch 116 is disposed. The clutch 116 is a member of the planetary gear arrangement 22. Other members of the planetary gear arrangement 22 include a rotating torque transmitting mechanism 118, a rotating torque transmitting mechanism 120, and two stationary torque transmitting mechanisms 122 and 124. These stationary torque transmitting mechanisms are also commonly termed brakes. A one-way drive mechanism 126 is also a member of the planetary gear arrangement 22.

The clutches 116, 118 and 120 and the brakes 122 and 124 are conventional fluid-operated, selectively-engageable type devices which are hydraulically engaged by an electrohydraulic control mechanism, not shown. The electrohydraulic control mechanism is a conventional control device used in many transmissions today.

The brakes 122 and 124 have friction plates 128 and 130, respectively, that are splined or otherwise drivingly connected with a housing 132 that is secured to or drivingly connected with the grounding member 48. The brakes 122 and 124 also include a plurality of friction plates 134 and 136, respectively, that are drivingly connected with a shell 138 and a shell 140, respectively.

The one-way mechanism 126 includes an outer race 142 that is drivingly connected with a hub 144 that transmits drive to the shell 140. The one-way mechanism 126 has an inner race 146 that is secured with the grounding member 48.

The clutch 116 includes the outer hub 114 connected to the input shaft 44 and an inner hub 148 that is drivingly connected to a sleeve shaft 150 with the carrier portion 82 of the planetary gear sets 54 and 56. Thus, when the clutch 116 is engaged, the planet carrier assembly 72 is drivingly connected with the input shaft 44.

The planet carrier assembly 62 includes a hub 152 which is drivingly connected with a hub 154. The hub 152 is a member of the clutch 120, and the hub 154 is a member of the clutch 118. The clutch 118 is operatively connected with the shell 138 which in turn is connected with the sun gear 68. The hub 152 is connectable with a shell 156 through clutch 120 which in turn is connected with the sun gear 76. Thus, when the clutch 120 is engaged, the sun gear 76 rotates in unison with the carrier assembly 62 and when the clutch 118 is engaged, the sun gear 68 rotates in unison with the carrier 62.

When the brake 122 is engaged, the sun gear 68 is held stationary through the shell 138, and when the brake 124 is engaged, the planet carrier assembly 82 is held stationary through the housing 140. The selective operation of the clutches 116, 118 and 120 and the brakes 122 and 124 in various combinations will provide six forward speed ratios and one reverse speed ratio.

To establish a reverse drive ratio, the clutch 118 and brake 124 are engaged. To establish the low forward or first forward speed ratio, the clutch 120 and the brake 124 may be engaged. If engine braking is not desired in the first forward speed, the one-way device 126 will automatically engage when the brake 124 is not engaged and the clutch 120 is engaged with no other friction devices engaged.

To establish the second forward speed ratio, the clutch 120 and brake 122 are engaged. To establish the third forward speed ratio, the clutch 120 and the clutch 118 are engaged. To establish the fourth forward speed ratio, the clutch 116 and the clutch 120 are engaged. To establish the fifth forward speed ratio, the clutch 118 and clutch 116 are engaged. And, to establish the sixth speed ratio, the clutch 116 and brake 122 are engaged.

For a more complete description of the power flow through the planetary gear sets 52, 54 and 56, one may review U.S. Pat. No. 5,106,352 to Lepelletier issued Apr. 21, 1992. This patent provides a more complete description of the power flow within the planetary gear sets.

The ring gear 70 is the output member for the planetary gear arrangement 22. With the present invention, the ring gear 70, as previously mentioned, is connected continuously with the ring gear 90 of the differential gear set 84. The sun gear member 86 of the differential gear set 84 is connected to drive the transmission output shaft 98 and the rear-wheel final drive 16 while the planet carrier assembly 88 is connected with the rotatable housing 100 to drive the sprocket 104 and therefore the final drive 18 through the transfer drive 24. The rotatable housing 100 completely surrounds the planetary gear arrangement 22 in the process of transferring the drive power from the planet carrier assembly 88 to the sprocket 104.

Since the brakes 122 and 124 require ground elements within the planetary gear arrangement 22, it has been found advantageous to utilize a central longitudinally extending grounding shaft 48 to accomplish this function. With the central grounding shaft 48, it is possible to transmit the front-wheel drive forces forward from the differential planetary through the rotatable housing 100, thus making a more compact axial arrangement and radial arrangement also, since a separate transfer shaft from the rear of the transmission forward is no longer necessary. The location of the transfer mechanism 24 is forward in the vehicle and requires less intrusion into the passenger compartment to accomplish this structure. Thus, through the use of a central grounding shaft and an enclosing rotatable drive housing, the overall size of the transmission is reduced considerably, thereby reducing the need for a large intrusion into the passenger compartment.

What is claimed is:

1. A powertrain comprising an engine and a transmission:

said transmission comprising a torque converter assembly drivingly connected with said engine, a planetary gear arrangement having an input shaft drivingly connected with said torque converter, and an output member drivingly connected with a differential gear assembly;

a plurality of planetary gear sets disposed between said torque converter and said differential gear assembly;

a plurality of torque transmitting mechanisms operatively connected with said planetary gear arrangement to establish a plurality of forward drive ratios and a reverse drive ratio between said input shaft and said differential gear assembly;

two of said torque transmitting mechanisms being stationary-type torque transmitting mechanisms having a ground member extending longitudinally within said transmission housing in surrounding and coaxial relationship with said input shaft;

a rotatable drive housing drivingly connected with said differential gear assembly and extending forwardly outboard of said planetary gear sets and said torque transmitting mechanisms;

a drive transfer mechanism drivingly connected with said rotatable drive housing at a location between said torque converter assembly and said planetary gear arrangement; and said transfer gear arrangement being operable to direct a portion of the output of said differential gear set to a front-wheel final drive mechanism.

2. A powertrain with a transmission, a front final drive, and a rear final drive, said transmission comprising:

a housing;

a torque converter having an output shaft;

a planetary gear assembly including a plurality of ratio gear sets having an output member, an input member and a plurality of torque transmitting mechanisms including at least one stationary torque transmitting mechanism and one rotatable torque transmitting mechanism;

said torque transmitting mechanisms being selectively operable to establish a plurality of drive ratios in said planetary gear set;

said torque converter output shaft extending longitudinally into said planetary gear arrangement and being operatively connectable with said one rotating torque transmitting mechanism;

a grounding shaft connected with said housing and extending longitudinally from a portion of said housing between said torque converter and said planetary gear arrangement circumjacent said torque converter output shaft and having a portion operatively connected with said one stationary torque transmitting mechanism;

a differential gear set having an input continuously connected with said planetary gear set output, a rear output connected with said rear final drive, and a forward output;

a rotatable housing drivingly connected with said forward output and being disposed in enclosing relation with said planetary gear set and said torque transmitting mechanisms; and a power transfer means disposed in said housing portion between said torque converter and said planetary gear assembly including an output member drivingly connected with said forward final drive and means connecting said rotatable housing with said power transfer means.

3. The transmission defined in claim 2 further comprising:

a second stationary torque transmitting mechanism operatively connectable between said ratio gear set and said grounding shaft and being disposed radially outward of said one stationary torque transmitting mechanism.

4. The transmission defined in claim 2 further comprising:

said rotatable housing being rotatably supported on said grounding shaft axially intermediate said torque converter and said torque transmitting mechanisms.

* * * * *